US010161257B2

(12) United States Patent
Huizenga et al.

(10) Patent No.: US 10,161,257 B2
(45) Date of Patent: Dec. 25, 2018

(54) TURBINE SLOTTED ARCUATE LEAF SEAL

(71) Applicant: General Electric Company, Schenectady, NY (US)

(72) Inventors: Benjamin Scott Huizenga, Cincinnati, OH (US); Kevin Robert Feldmann, Mason, OH (US); Robert Alan Frederick, West Chester, OH (US); Robert Charles Groves, II, West Chester, OH (US); Kirk Douglas Gallier, Liberty Township, OH (US); Timothy Francis Andrews, Sharonville, OH (US); Darrell Senile, Oxford, OH (US)

(73) Assignee: General Electric Company, Schenectady, NY (US)

( * ) Notice: Subject to any disclaimer, the term of this patent is extended or adjusted under 35 U.S.C. 154(b) by 315 days.

(21) Appl. No.: 14/887,537

(22) Filed: Oct. 20, 2015

(65) Prior Publication Data
US 2017/0107837 A1 Apr. 20, 2017

(51) Int. Cl.
F01D 11/00 (2006.01)
F01D 5/28 (2006.01)
(Continued)

(52) U.S. Cl.
CPC .......... F01D 11/005 (2013.01); F01D 5/284 (2013.01); F01D 9/041 (2013.01); F01D 9/047 (2013.01);
(Continued)

(58) Field of Classification Search
CPC ........ F01D 11/005; F01D 9/041; F01D 9/047; F01D 9/023; F01D 25/12; F16J 15/0887;
(Continued)

(56) References Cited

U.S. PATENT DOCUMENTS 2,919,891 A * 1/1960 Oliver ................... F01D 11/001
415/110
3,501,249 A * 3/1970 Scalzo .................... F01D 5/081
416/193 A
(Continued)

FOREIGN PATENT DOCUMENTS

EP 1 965 031 A3 4/2011
EP 2 055 900 A3 2/2012
(Continued)

OTHER PUBLICATIONS

A European Search Report and Opinion issued in connection with Related EP Application No. 15199348.2 dated Apr. 29, 2016.
(Continued)

Primary Examiner — Jason Shanske
Assistant Examiner — Topaz L Elliott
(74) Attorney, Agent, or Firm — General Electric Company; William Andes

(57) ABSTRACT

A gas turbine engine arcuate leaf seal assembly includes arcuate leaf seal extending radially and circumferentially between adjacent first and second turbine components. Upper and lower leaf seal portions of leaf seal are in radially spaced apart arcuate upper and lower grooves in the first and second turbine components respectively. The seal includes an arcuate body and a circumferential retention tab extending radially away from body and disposed in a notch in a wall of grooves. Seal may have a thickness between 3 mils and 35 mils and/or torsional stiffness between 0.015 and 0.15 lb/in. Turbine components may be radially adjacent turbine nozzle upper and lower components. The upper or lower component may be made of a ceramic matrix composite material. Annular cooling air plenum including flow cavities in inner support ring segments may be in lower
(Continued)

component and in flow communication with hollow fairing airfoils.

12 Claims, 11 Drawing Sheets

(51) Int. Cl.
    *F16J 15/08*     (2006.01)
    *F16J 15/06*     (2006.01)
    *F01D 25/12*     (2006.01)
    *F01D 9/04*     (2006.01)
    *F01D 9/02*     (2006.01)

(52) U.S. Cl.
    CPC ............ *F01D 25/12* (2013.01); *F16J 15/061* (2013.01); *F16J 15/0887* (2013.01); *F01D 9/023* (2013.01); *F05D 2220/32* (2013.01); *F05D 2240/57* (2013.01); *F05D 2250/71* (2013.01); *F05D 2300/6033* (2013.01)

(58) Field of Classification Search
    CPC .............. F16J 15/061; F05D 2240/128; F05D 2240/57; F05D 2220/32; F05D 2250/71; F05D 2300/6033
    See application file for complete search history.

(56) References Cited

U.S. PATENT DOCUMENTS

| | | | | |
|---|---|---|---|---|
| 4,379,560 A | * | 4/1983 | Bakken | .................. F01D 9/023 277/628 |
| 4,425,078 A | * | 1/1984 | Robbins | ................ F01D 11/005 277/628 |
| 6,375,415 B1 | * | 4/2002 | Burdgick | .................. F01D 5/18 415/115 |
| 6,464,457 B1 | | 10/2002 | Morgan et al. | |
| 6,652,229 B2 | | 11/2003 | Lu | |
| 6,792,763 B2 | * | 9/2004 | Sileo | ....................... F01D 9/023 60/796 |
| 7,008,185 B2 | | 3/2006 | Peterman et al. | |
| 7,114,917 B2 | | 10/2006 | Legg | |
| 7,264,447 B2 | * | 9/2007 | Ono | ....................... F01D 5/3015 416/193 A |
| 7,303,371 B2 | * | 12/2007 | Oltmanns | ............. F01D 11/001 415/191 |
| 7,500,832 B2 | * | 3/2009 | Zagar | .................... F01D 5/3015 416/220 R |
| 7,798,775 B2 | | 9/2010 | Kammel et al. | |
| 8,096,776 B2 | * | 1/2012 | Bluck | .................. F01D 5/3015 416/219 R |
| 8,292,573 B2 | | 10/2012 | Broomer et al. | |
| 8,292,580 B2 | | 10/2012 | Schiavo et al. | |
| 8,371,812 B2 | | 2/2013 | Manteiga et al. | |
| 8,684,680 B2 | | 4/2014 | Marlin et al. | |
| 8,821,114 B2 | * | 9/2014 | Afanasiev | ............. F01D 11/005 415/170.1 |
| 9,464,535 B2 | * | 10/2016 | Takagi | .................. F01D 11/003 |
| 2007/0025837 A1 | | 2/2007 | Pezzetti, Jr. et al. | |
| 2010/0068034 A1 | | 3/2010 | Schiavo et al. | |
| 2010/0232939 A1 | * | 9/2010 | Piersall | .................. F01D 5/082 415/173.1 |
| 2011/0236183 A1 | | 9/2011 | Amaral et al. | |
| 2011/0299978 A1 | | 12/2011 | Afanasiev et al. | |
| 2011/0318171 A1 | | 12/2011 | Albers et al. | |
| 2012/0292862 A1 | * | 11/2012 | Moehrle | ............... F01D 11/003 277/654 |
| 2013/0028717 A1 | | 1/2013 | Helvaci et al. | |
| 2013/0089414 A1 | | 4/2013 | Harding | |
| 2013/0115065 A1 | | 5/2013 | Correia et al. | |
| 2013/0177387 A1 | | 7/2013 | Rioux | |
| 2013/0315708 A1 | | 11/2013 | Rendon | |
| 2013/0323045 A1 | * | 12/2013 | Porter | .................. F16J 15/0887 415/229 |
| 2014/0346741 A1 | * | 11/2014 | Takagi | .................. F01D 11/003 277/641 |
| 2015/0093249 A1 | | 4/2015 | Lang et al. | |
| 2016/0201515 A1 | * | 7/2016 | Chang | .................. F01D 25/246 60/805 |

FOREIGN PATENT DOCUMENTS

| | | |
|---|---|---|
| EP | 2 481 988 A2 | 8/2012 |
| EP | 2587099 A1 | 5/2013 |
| WO | WO 2014/070438 A1 | 5/2014 |
| WO | 2015009392 A2 | 1/2015 |

OTHER PUBLICATIONS

A European Search Report and Opinion issued in connection with Corresponding EP Application No. 16193752.9 dated Feb. 22, 2017.
GE Related Case Form.

* cited by examiner

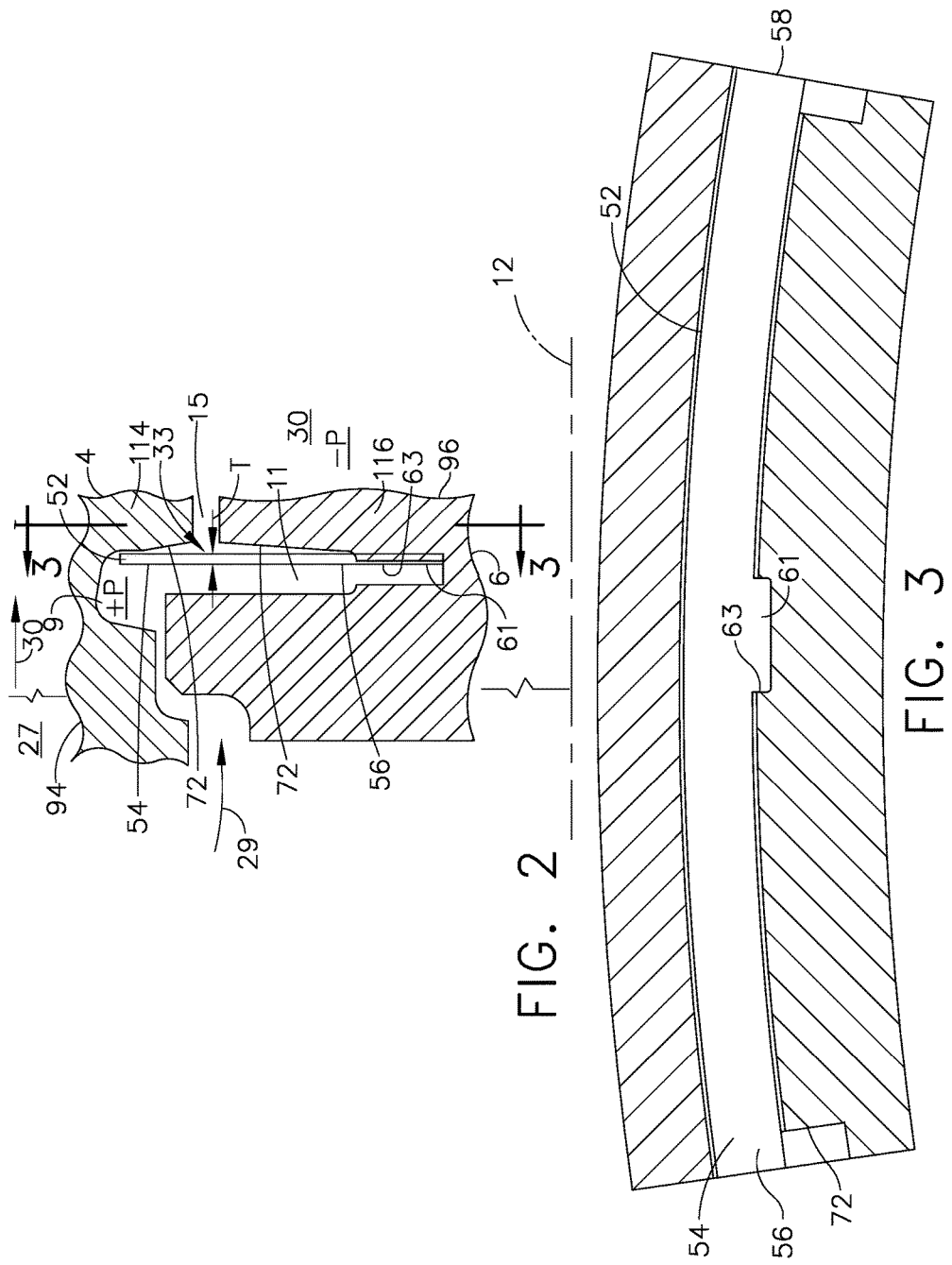

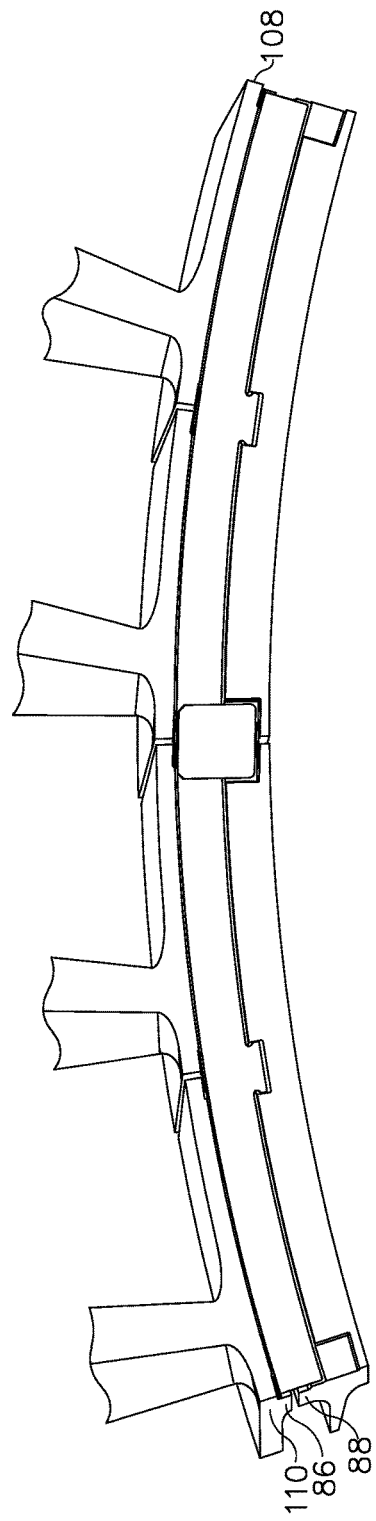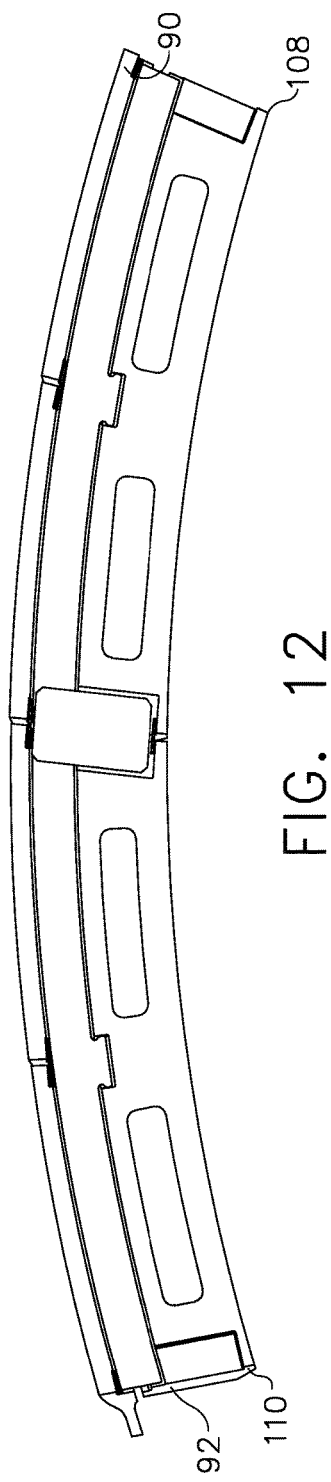

TURBINE SLOTTED ARCUATE LEAF SEAL

BACKGROUND OF THE INVENTION

Technical Field

The present invention relates generally to gas turbine engine turbine flowpath seals and, more specifically, to arcuate leaf seals and mounting thereof.

Background Information

Gas turbine engine high pressure turbines typically include turbine nozzles separately manufactured and assembled into position in the engine. Accordingly, gaps are necessarily provided therebetween for both assembly purposes as well as for accommodating differential thermal expansion and contraction during operation of the engine. Gaps between these stationary stator components are suitably sealed for preventing leakage therethrough. In a typical high pressure turbine nozzle, a portion of the compressor air is bled and channeled through the nozzle vanes for cooling thereof. The use of bleed air reduces the overall efficiency of the engine and, therefore, is minimized whenever possible. The bleed air is at a relatively high pressure greater than the pressure of the combustion gases flowing through the turbine nozzle and, therefore, would leak into the exhaust flowpath without providing suitable seals between the stator components.

Arcuate leaf seals are particularly useful to seal these gaps in the turbine flowpaths. The leaf seals typically used in such applications are arcuate and disposed end to end around the circumference of the stator components which are segmented. For example, the radially outer band of the turbine nozzle includes axially spaced apart forward and aft rails. These rails extend radially outwardly, with the aft rail abutting a complementary surface on the adjoining shroud or shroud hanger, for providing a primary friction seal therewith. The leaf seal provides a secondary seal at this junction and bridges a portion of the aft rail and the shroud hanger for example. Circumferential seals or arcuate leaf seals typically require a large space to effectively seal and cover a large range of relative motion between the two surfaces to be sealed.

In order to assemble and mount the leaf seals to the aft rail, each leaf seal typically includes mounting holes at opposite circumferential ends thereof through which are mounted corresponding mounting pins. Corresponding springs such as leaf springs are also used at respective ones of the mounting pins for pre-loading the loosely supported leaf seals against the aft rail and the shroud hanger.

In order to support the leaf seals, leaf springs, and mounting pins, the outer band may include a plurality of circumferentially spaced apart, radially extending tabs spaced axially from the aft rail. A recess is formed between the tabs and the aft rail in which the leaf seal and leaf spring are disposed. The tabs include forward holes aligned with corresponding aft holes which extend into but not all the way through the aft rail. The mounting pins are inserted through holes in the tabs, leaf spring, leaf seal, and into the aft rail and then fixedly joined thereto by tack welding heads of the mounting pins to the corresponding tabs.

To accommodate relative movement between the nozzles and mating hardware, the leaf seals are designed to float about the mounting pins that are firmly attached to the nozzle segment. During engine operation, pressure differential between the cooling supply air and the flowpath air holds the seal against the mating hardware. Springs are used to provide positive contact at the sealing surface when pressure loading across the seal is low.

This mounting arrangement for the leaf seals is relatively complex and subject to damage during the assembly process in view of the relatively close quarters in this region. A smaller and less complex leaf seal mounting system is desired for simplifying the manufacture and assembly thereof and eliminating tack welding of the mounting pins and drilling of a blind hole into the aft rail or flange. A smaller and less complex leaf seal mounting system is desired to accommodate tight and small turbine stator assemblies.

SUMMARY OF THE INVENTION

A gas turbine engine arcuate leaf seal assembly includes an arcuate leaf seal extending radially and circumferentially between adjacent first and second turbine components. The leaf seals are operable for preventing or inhibiting leakage between first and second fluid volumes through a gap between the first and second turbine components and upper and lower leaf seal portions of the arcuate leaf seals are disposed in radially spaced apart arcuate leaf seal upper and lower grooves in the first and second turbine components respectively.

The leaf seal may include an arcuate body and at least one circumferential retention tab extending radially away from the arcuate body. The retention tab may be disposed in a notch in a forward or aft annular wall or an aft annular wall of the upper or lower grooves. The retention tab may be sufficiently flexible for the leaf seal to engage seal edges on upper and lower faces of the upper and lower grooves respectively during the entire range of engine operation. The leaf seal may have a thickness in a range of from 3 mils to 35 mils. The leaf seal may be made of a material with torsional stiffness in a range between 0.015 lb/in and 0.15 lb/in.

One of the turbine nozzle upper and lower components may include or be made of a ceramic matrix composite material.

The adjacent first and second turbine components may be radially adjacent turbine nozzle upper and lower components respectively or the adjacent first and second turbine components being axially adjacent.

A segmented turbine nozzle may include a ring of turbine nozzle segments circumscribed about an axis. Each of the turbine nozzle segments includes a radially inner support ring segment, a radially outer support ring segment, and at least one nozzle fairing supported and disposed therebetween. A strut is coupled to and operable for carrying loads between the inner and outer support ring segments. The nozzle fairing includes radially spaced apart inner and outer band segments and a fairing airfoil or vane extending radially therebetween. At least one gas turbine engine arcuate leaf seal assembly including an arcuate leaf seal extends radially and circumferentially between the inner band segment and the inner support ring segment. Upper and lower leaf seal portions of the arcuate leaf seal are disposed in radially spaced apart arcuate leaf seal upper and lower grooves in the inner band segment and the inner support ring segment respectively.

The turbine nozzle may further include forward and aft turbine leaf seal assemblies including the at least one gas turbine engine arcuate leaf seal assembly, the forward and aft turbine leaf seal assemblies positioned at forward and aft ends of the nozzle segment respectively between the inner support ring segment and the inner band segment of the fairing, each of the forward and aft turbine leaf seal assemblies including an arcuate leaf seal extending radially and circumferentially between the inner band segment and the inner support ring segment, each of the forward and aft turbine leaf seal assemblies including radially spaced apart arcuate leaf seal upper and lower grooves in upper and lower flanges of the inner band segment and the inner support ring segment respectively, and upper and lower leaf seal portions of each of the arcuate leaf seals of each of the forward and aft turbine leaf seal assemblies disposed in the radially spaced apart arcuate leaf seal upper and lower grooves in the inner band segment and the inner support ring segment respectively.

An annular cooling air plenum including flow cavities disposed in the inner support ring segments may be in flow communication with the hollow fairing airfoils. The nozzle fairing may be made of a ceramic matrix composite material.

BRIEF DESCRIPTION OF THE DRAWINGS

The invention, in accordance with preferred and exemplary embodiments, is more particularly described in the following detailed description taken in conjunction with the accompanying drawings in which:

FIG. 2 is a side or circumferential view illustration of an exemplary embodiment of a slotted leaf seal mounting assembly for use in the turbine nozzle illustrated in FIG. 1.

FIG. 3 is an axial view illustration of the exemplary embodiment of the slotted leaf seal mounting assembly through 3-3 in FIG. 2.

FIG. 11 is an enlarged perspective view illustration of an aft leaf seal mounting assembly illustrated through 11-11 in FIG. 10.

FIG. 12 is an enlarged perspective view illustration of a forward leaf seal mounting assembly illustrated through 11-11 in FIG. 10.

DESCRIPTION

Figure 1:
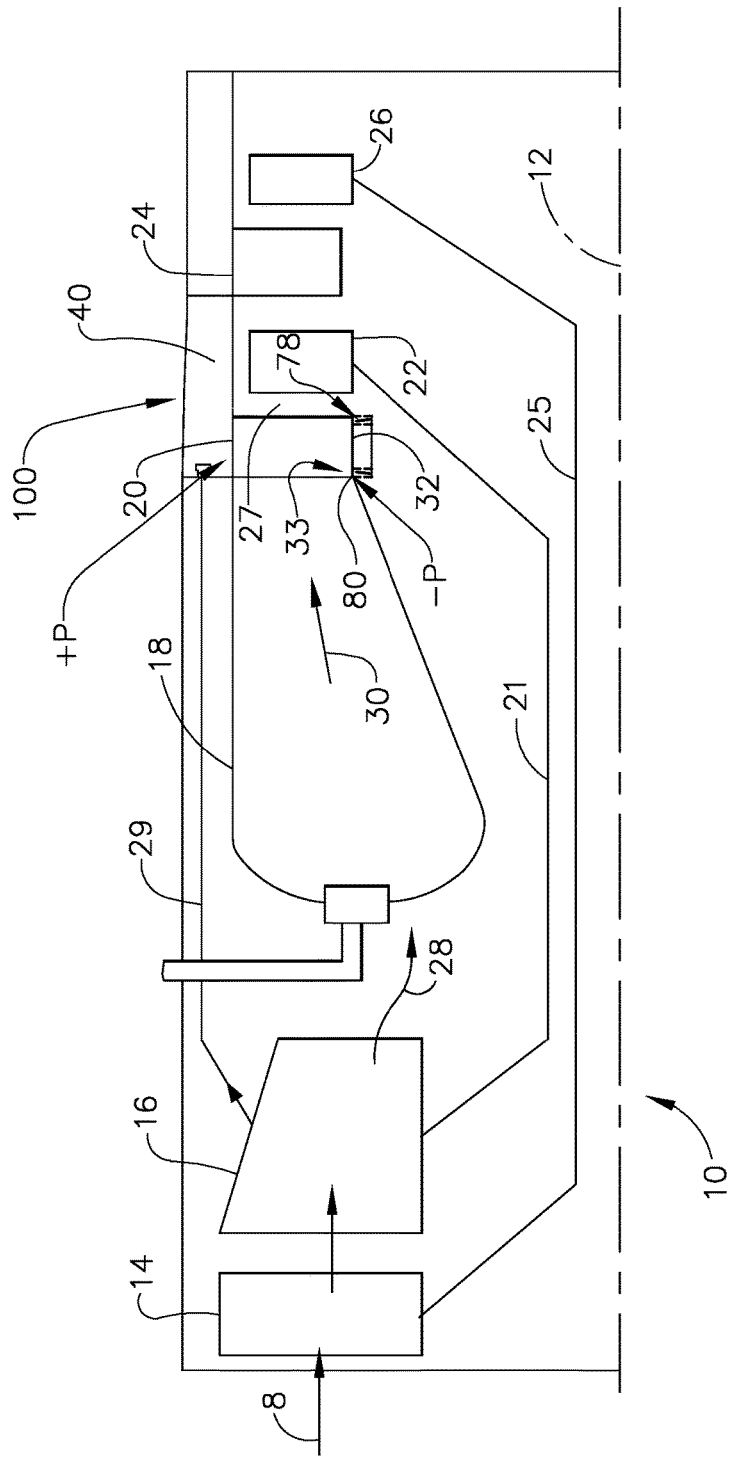
FIG. 1 is a schematical illustration of an exemplary aircraft turbofan gas turbine engine including a turbine nozzle with an exemplary embodiment of an arcuate turbine slotted leaf seal assembly.

Illustrated schematically in FIG. 1 is an exemplary aircraft turbofan gas turbine engine 10 which is axisymmetrical about a longitudinal or axial centerline axis 12. The engine 10 includes in serial flow communication, a fan 14, multi-stage axial compressor 16, annular combustor 18, a high pressure turbine including a high pressure turbine nozzle 20 upstream of and followed by a single stage high pressure turbine rotor 22, and one or more stages of low pressure turbine nozzles 24 and rotors 26. The high pressure rotor 22 is joined to the compressor 16 by a first shaft 21 and the low pressure rotor 26 is joined to the fan 14 by a coaxial second shaft 25. During operation, ambient air 8 flows downstream through the fan 14, the compressor 16 from where it exits as compressed air 28 and is then flowed into the combustor 18. The compressed air 28 is mixed with fuel and ignited in the combustor 18 generating hot combustion gases 30 which flow downstream through turbine stages which extract energy therefrom for powering both the fan 14 and the compressor 16. The various stator and rotor components of the turbines downstream from the combustor 18 define a turbine flowpath 27 which channels the hot combustion gases therethrough for discharge from the engine. Downstream of and adjacent to the high pressure turbine nozzle 20 is the high pressure turbine rotor 22. The high pressure turbine rotor 22 may take any conventional form having a plurality of circumferentially spaced apart turbine blades extending radially outwardly from a rotor disk for extracting energy from the gases 30 and powering the compressor 16.

A portion of the compressed air 28 is bled from the compressor 16 and used as cooling air 29 which is channeled to various parts of the turbines such as the high pressure nozzle 20 to provide cooling thereof. Some of the cooling air 29 is channeled around and through the high pressure turbine nozzle 20 at a substantially high pressure +P compared to the low pressure −P of the combustion gases 30 flowing through the turbine flowpath 27 in the high pressure turbine nozzle 20 during engine operation.

Figure 6:
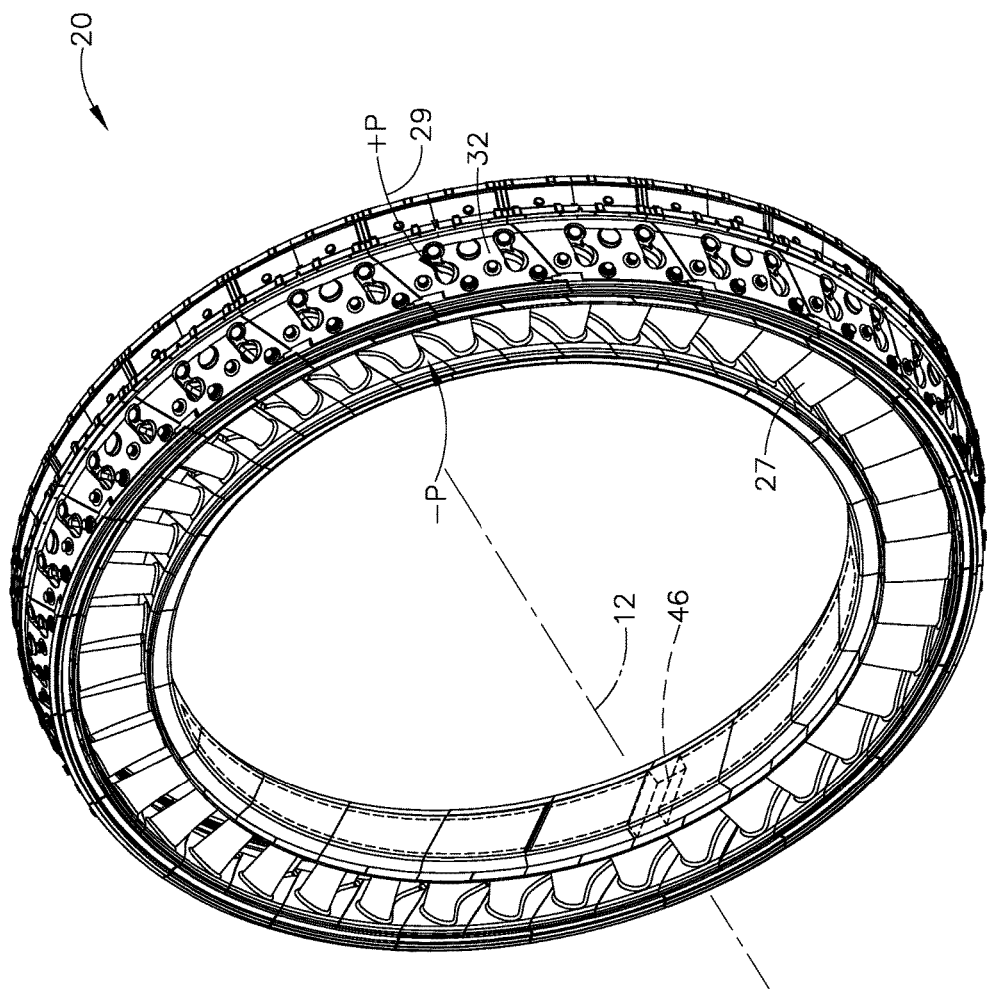
FIG. 6 is a perspective view illustration of an exemplary turbine nozzle for use in the engine illustrated in FIG. 1.

Turbine components are often manufactured in arcuate segments and then assembled together in the engine 10 forming axially adjacent turbine components such as a turbine shroud segment 40 located adjacent to and downstream of a turbine nozzle segment 32 as illustrated in FIGS. 1, 6, and 16. Various joints or gaps are provided between annular assemblies of arcuate segments which must be suitably sealed for preventing leakage of the high pressure +P cooling air 29 into the turbine flowpath 27 through which the low pressure −P combustion gases 30 flow during engine operation. The use of bleed air for cooling turbine components necessary decreases the overall efficiency of the engine 10 and its use is minimized. It is desirable to provide suitable seals between the stationary or stator turbine components for reducing to a minimum the amount of cooling air leakage into the exhaust flowpath for increasing efficiency of the engine.

Schematically illustrated in FIGS. 1-3 is an arcuate first turbine component 4 cooled with the cooling air 29 at a relatively high pressure +P compared to the relatively low pressure −P of the combustion gases 30 channeled through the first turbine component 4 of the nozzle 20. An arcuate turbine slotted leaf seal assembly 33 may include an arcuate leaf seal 52 extending radially and circumferentially between a second turbine component 6 and the first turbine component 4 of the nozzle 20 to prevent or inhibit leakage of the cooling air 29 into the turbine flowpath 27 through a gap 15 between the first and second turbine components 4, 6.

The first and second turbine components 4, 6 are adjacent and include first and second portions 114, 116 respectively that are spaced radially apart with respect to the axis 12 and include radially spaced apart first and second or arcuate leaf seal upper and lower grooves 9, 11 or slots. Upper and lower leaf seal portions 54, 56 of the arcuate leaf seal 52 are disposed in the upper and lower slots or grooves 9, 11 in the first and second portions 114, 116 respectively. The arcuate leaf seal 52 is substantially fully disposed in the upper and lower grooves 9, 11.

The adjacent first and second turbine components 4, 6 may be turbine nozzle radially inner and outer or upper and lower components 94, 96 used in arcuate segments in the engine 10 such as the turbine nozzle segment 32 illustrated in FIGS. 6-9. The upper and lower components 94, 96 may include arcuate leaf seal upper and lower grooves 9, 11 in which upper and lower leaf seal portions 54, 56 respectively of the arcuate leaf seal 52 are disposed. The arcuate leaf seal 52 is substantially fully disposed in the upper and lower grooves 9, 11.

Figure 4:
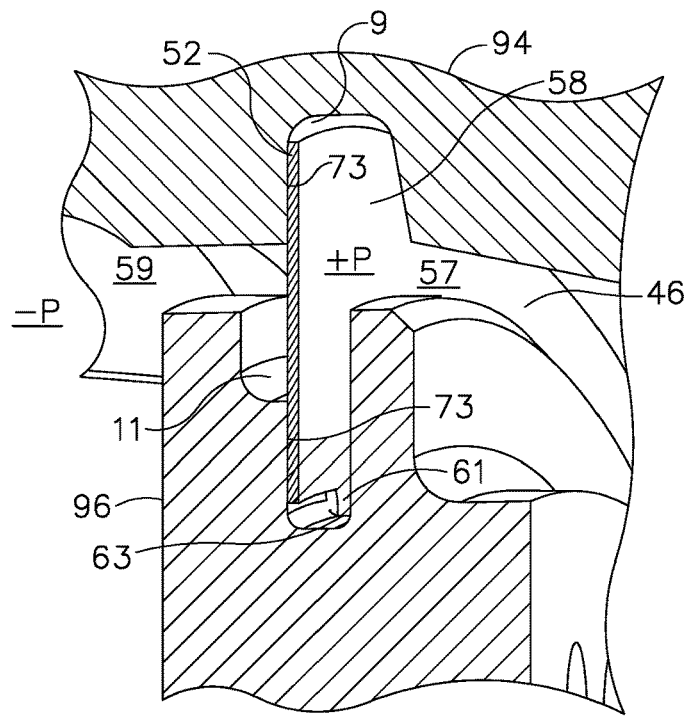
FIG. 4 is a perspective view illustration of an exemplary embodiment of a slotted leaf seal mounting assembly for use in the turbine nozzle illustrated in FIG. 1.
Figure 5:
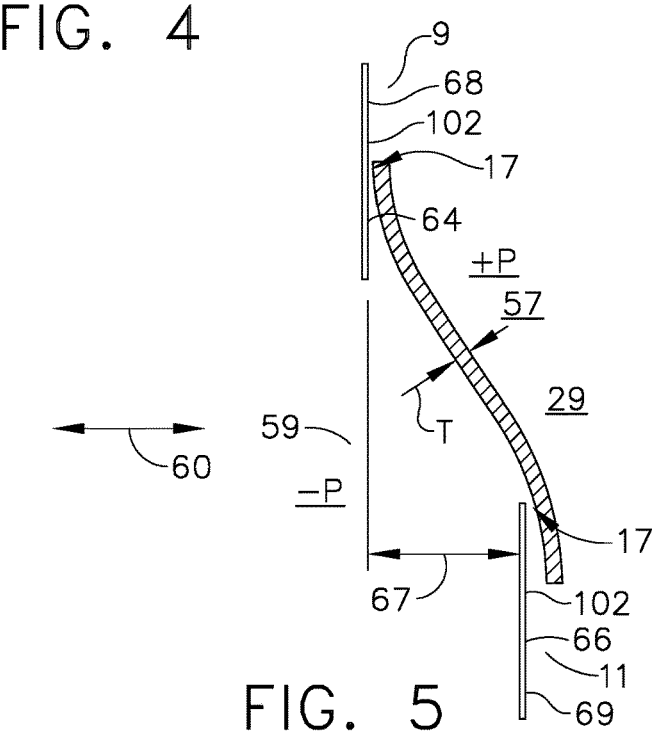
FIG. 5 is a schematical view illustration of the slotted leaf seal illustrated in FIG. 2 in a sealed position.

The arcuate leaf seal 52, as illustrated in FIGS. 2-5 and 8, includes an arcuate body 58 and at least one circumferential retention tab 61 extending radially away from the arcuate body 58. The circumferential retention tab 61 is disposed in and engages a notch 63 of a forward annular wall 72 as illustrated in FIG. 3 or an aft annular wall 73 of the upper or lower grooves 9, 11 as illustrated in FIG. 4. The arcuate leaf seal 52 is captured in the upper and lower grooves 9, 11 as particularly illustrated in FIGS. 2 and 4. A locus of contact points 17 between the arcuate leaf seal 52 and contact walls 102 of the upper and lower grooves 9, 11 serve to create a seal between two fluid volumes denoted herein as first and second fluid volume 57, 59 as illustrated in FIG. 5.

Referring to FIGS. 6-9, the first fluid volume 57 is illustrated herein as a cooling air plenum 46 which receives the cooling air 29 channeled through circumferentially spaced apart hollow stator airfoils 39 of the high pressure turbine nozzle 20 at a substantially high pressure +P. The second fluid volume 59 is illustrated herein as the combustion gases 30 in the turbine flowpath 27 through the high pressure turbine nozzle 20 which operates at the low pressure −P during engine operation.

Illustrated in FIGS. 2-5 is the arcuate leaf seal 52 and the contact points 17 which divide the two fluid volumes or flowpaths. The relative position of the upper groove 9 to the lower groove 11 may be in a range in both the axial or horizontal direction 60 and the radial or vertical direction 62. Due to this range of relative positioning, the nature of the contact points between the seal and the two grooves may be variable. In the position illustrated in FIG. 4, the leaf seal 52 contacts an upper face 64 of the upper groove 9, and a lower face 66 of the lower groove 11. The surface contact on both of these faces creates the locus of contact points 17 which separate the two fluid volumes.

The degree of leakage between these two fluid volumes is dependent upon the conformance of the leaf seal to small surface irregularities on both upper and lower contact surfaces 68, 69 of the upper and lower faces 64, 66 respectively, and upon the elasticity of the leaf seal 52 and ability to conform under a pressure load generated by a differential pressure. The differential pressure is between the high pressure +P in the first fluid volume 57 or the chamber containing the cooling air 29 and the low pressure −P in the second fluid volume 59 or the turbine flowpath 27 in the high pressure turbine nozzle 20 during engine operation.

The contact points 17 are on smaller surface areas of the upper and lower contact surfaces 68, 69 of the upper and lower faces 64, 66 respectively in some other axially offset positions of the upper and lower grooves 9, 11. Illustrated in FIG. 5 is an example of a large horizontal offset in the axial or horizontal direction 60 between the upper and lower grooves 9, 11. The contacts along the contact points 17 are edge contacts as illustrated in FIG. 5 for a horizontal offset 67 between the upper and lower grooves 9, 11. The upper leaf seal portion 54 of the leaf seal 52 contacts the upper face 64 of the upper groove 9 while the lower leaf seal portion 56 of the leaf seal contacts a groove edge on the lower face 66 of the lower groove 11.

Referring to FIGS. 2-5, the circumferential retention tab 61 is flexible so as to allow engagement of the leaf seal 52 with seal edges on upper and lower faces 64, 66 of the upper and lower grooves 9, 11 respectively during the entire range of engine operation. The arcuate body 58 of the arcuate leaf seal 52 is able to conform to the upper and lower grooves 9, 11. The arcuate body 58 may have a range of thickness and stiffness as may the leaf seal 52. The leaf seal 52 including the arcuate body 58 may have a thickness T in a range of from 3 mils to 35 mils and may use materials with torsional stiffness in a range between 0.015 lb/in and 0.15 lb/in.

In the exemplary engine illustrated in FIG. 1, one embodiment of the turbine leaf seal assembly 33 is located between the turbine flowpath 27 through the high pressure turbine nozzle 20 and cooling air 29 flowing within static structure of the high pressure turbine nozzle 20. The leaf seal assembly 33 may be used and adapted for other analogous sealing applications within the engine 10 and, in particular, between the various turbine stator components thereof. One example of a stationary or stator turbine arcuate component is the turbine nozzle segment 32 of the annular high pressure turbine nozzle 20 illustrated in FIGS. 6-8 and 16. Circumferentially adjoining nozzle segments 32 are bolted or otherwise joined together to form the full ring annular high pressure turbine nozzle 20 as illustrated in FIGS. 6 and 9.

Illustrated in FIGS. 6-10, is one exemplary high pressure segmented turbine nozzle 20 including a ring of turbine nozzle segments 32 circumscribed about the axis 12. The exemplary embodiment of the turbine nozzle 20 and the turbine nozzle segment 32 illustrated in FIGS. 6-9 was developed for CMC vanes and is disclosed in more detail in U.S. patent application Ser. No. 14/574,472 titled "Ceramic Matrix Composite Nozzle Mounted With a Strut and Concepts Thereof" by Benjamin Scott Huizenga et al., filed Dec. 18, 2014 and incorporated herein by reference.

The turbine nozzle 20 includes segmented annular outer and inner bands 35, 36 and a plurality of airfoils or vanes 75 extending radially therebetween. Each of the turbine nozzle segments 32 includes a radially inner support ring segment 45, a radially outer support ring segment 47 and at least one nozzle fairing 50 supported and disposed therebetween. Extending radially through at least one nozzle fairings 50 is a strut 70 which carries load from the inner support ring segment 45 to the outer support ring segment 47 where load is transferred to a static structure 13 such as an engine casing and mechanically supports the nozzle segment 32 as illustrated in FIG. 8. The nozzle fairing 50 includes radially spaced apart inner and outer band segments 71, 74 and a fairing airfoil 98 therebetween. One particular embodiment of the nozzle fairing 50 is a CMC fairing 50 made of a ceramic matrix composite material.

The strut 70 carries load from the radially inward side of the nozzle segment 32 at the inner support ring 38 to the radially outward side at the outer support ring 37 where load is transferred to a static structure and mechanically supports the nozzle fairing 50. The strut 70 may be connected to at least one of the inner support ring 38 and the outer support ring 37 in a variety of manners described herein including by bolting, fastening, capturing, combinations thereof and being integrally formed.

The fairing 50 may be of the single vane type, generally known as a "singlet" or may be of the double vane type generally known as a "doublet". These are merely exemplary as additional numbers of vanes may be utilized in the nozzle segment 32. The upper surface of the inner band segment 71 provides one flow surface for combustion gas. The lower surface of the outer band segment 74 provides an opposite flow surface for the combustion gas. These surfaces define boundaries for flow of combustion gas through the nozzle segment 32 with the vane extending therebetween.

Figure 7:
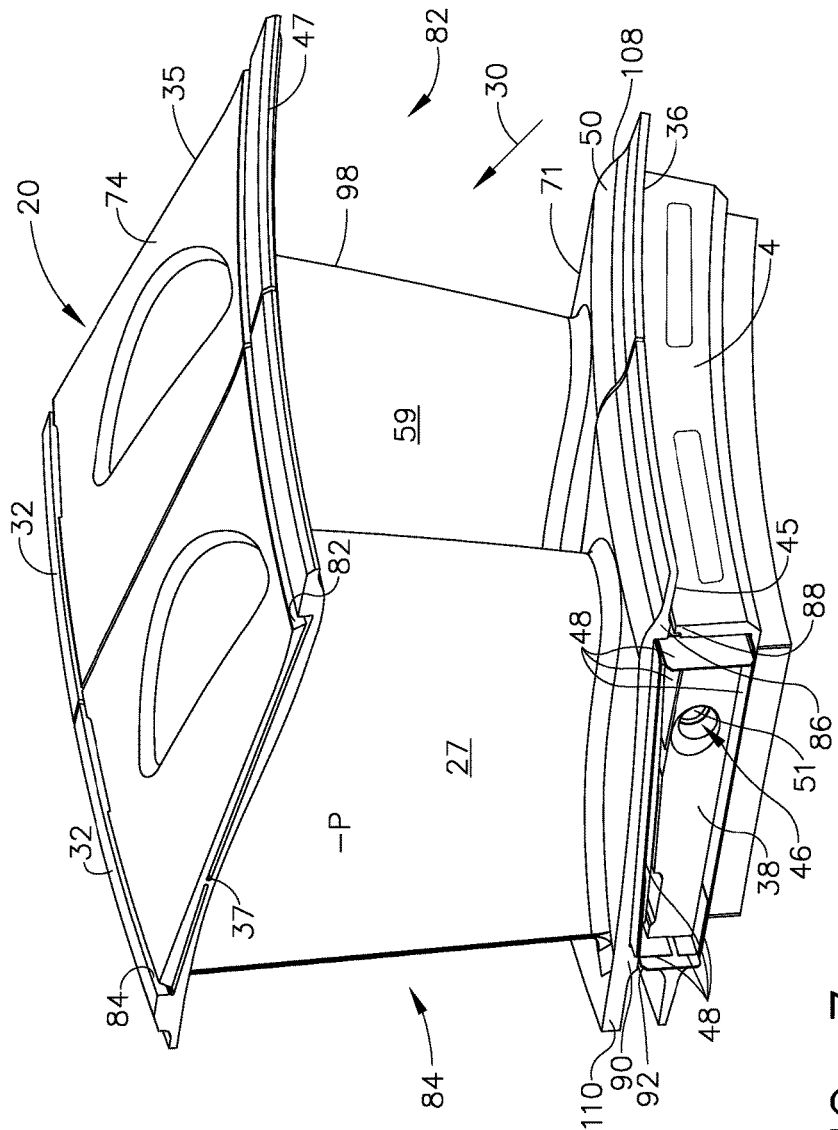
FIG. 7 is an enlarged perspective view illustration of a turbine nozzle segment in the exemplary turbine nozzle illustrated in FIG. 6.
Figure 8:
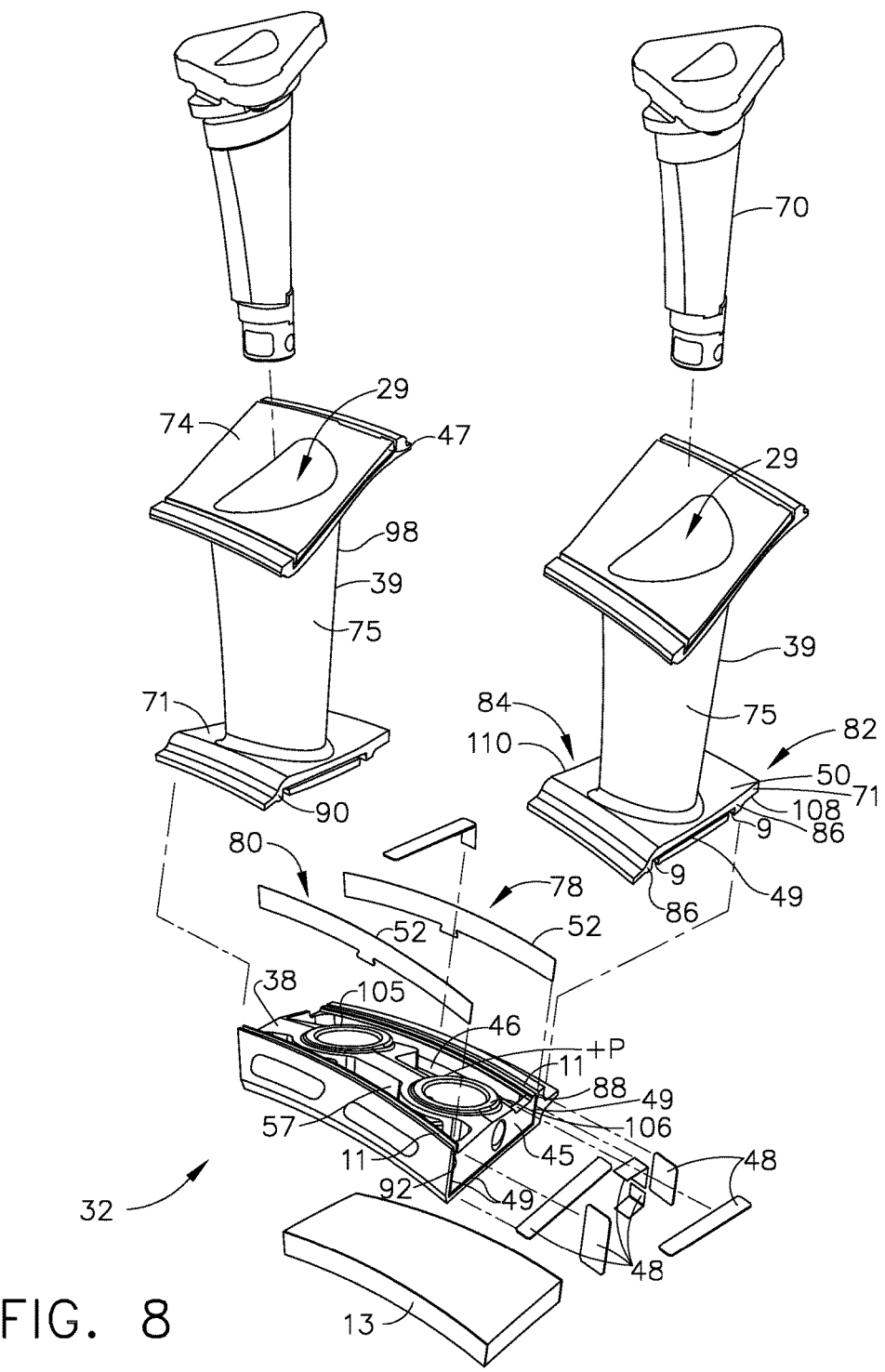
FIG. 8 is an exploded view illustration of the turbine nozzle segment illustrated in FIG. 7.
Figure 9:
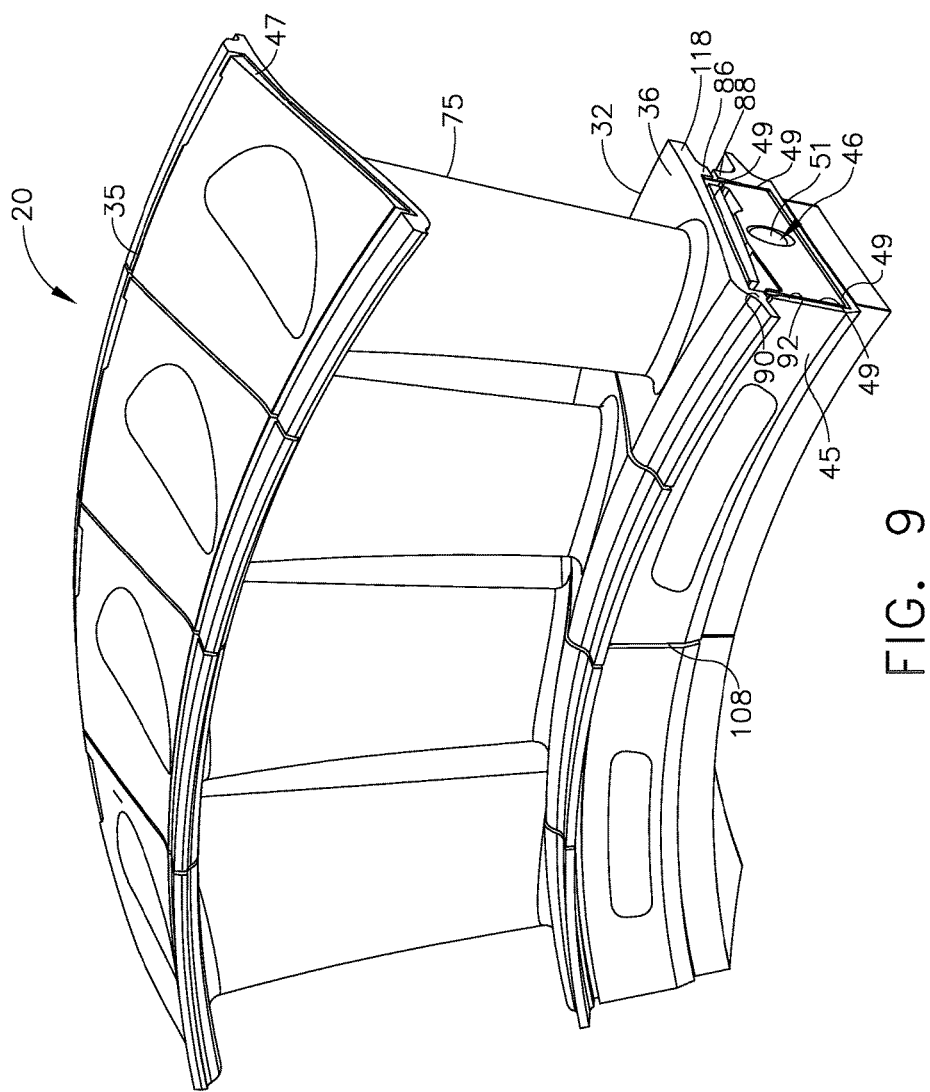
FIG. 9 is a perspective view illustration of a turbine fairing in the turbine nozzle segment illustrated in FIG. 8.
Figure 10:
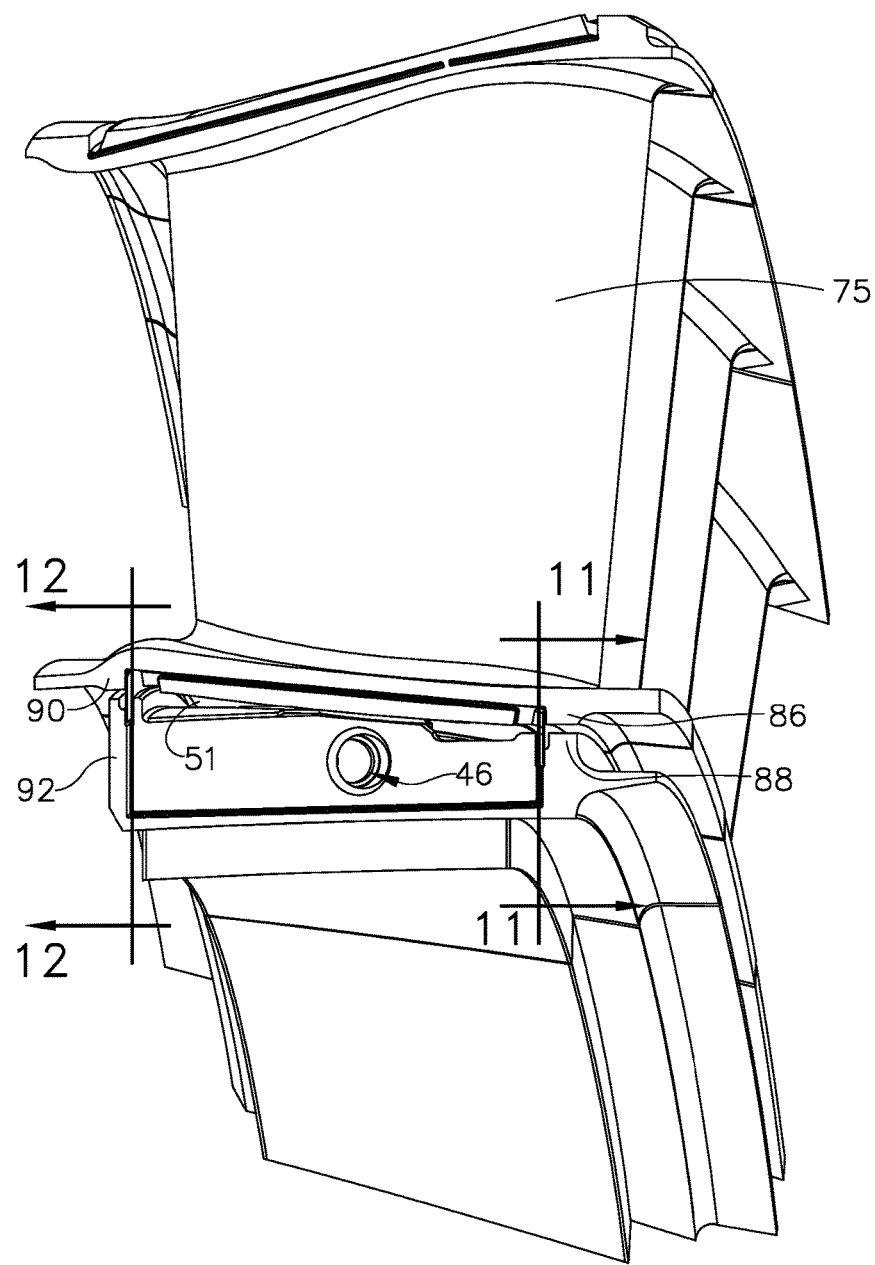
FIG. 10 is a circumferentially oriented perspective view illustration of a turbine fairing in the turbine nozzle segment illustrated in FIG. 8.
Figure 13:
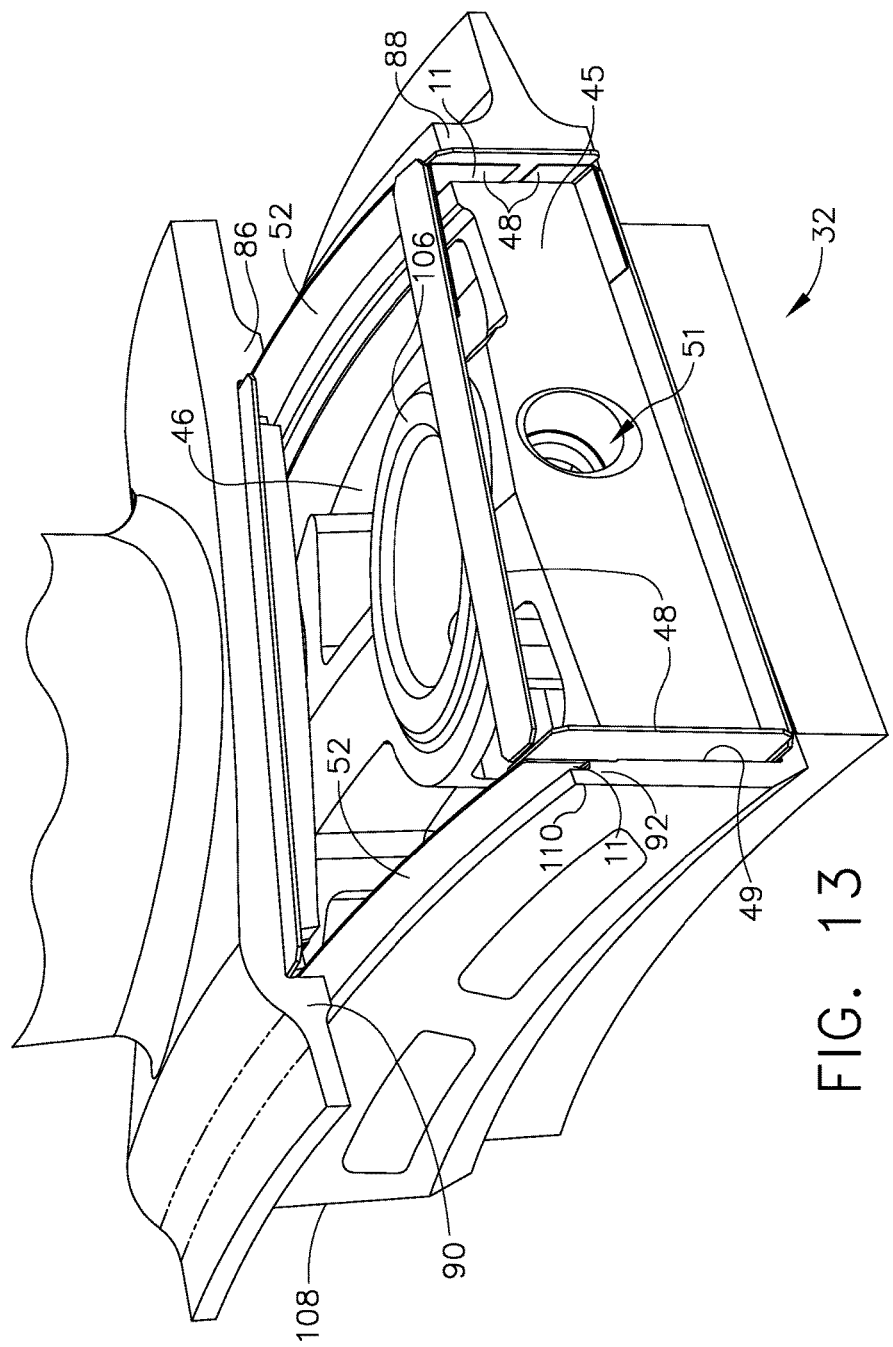
FIG. 13 is a perspective view illustration of an inner support ring segment with a single turbine fairing removed in the turbine nozzle segment illustrated in FIG. 8.
Figure 14:
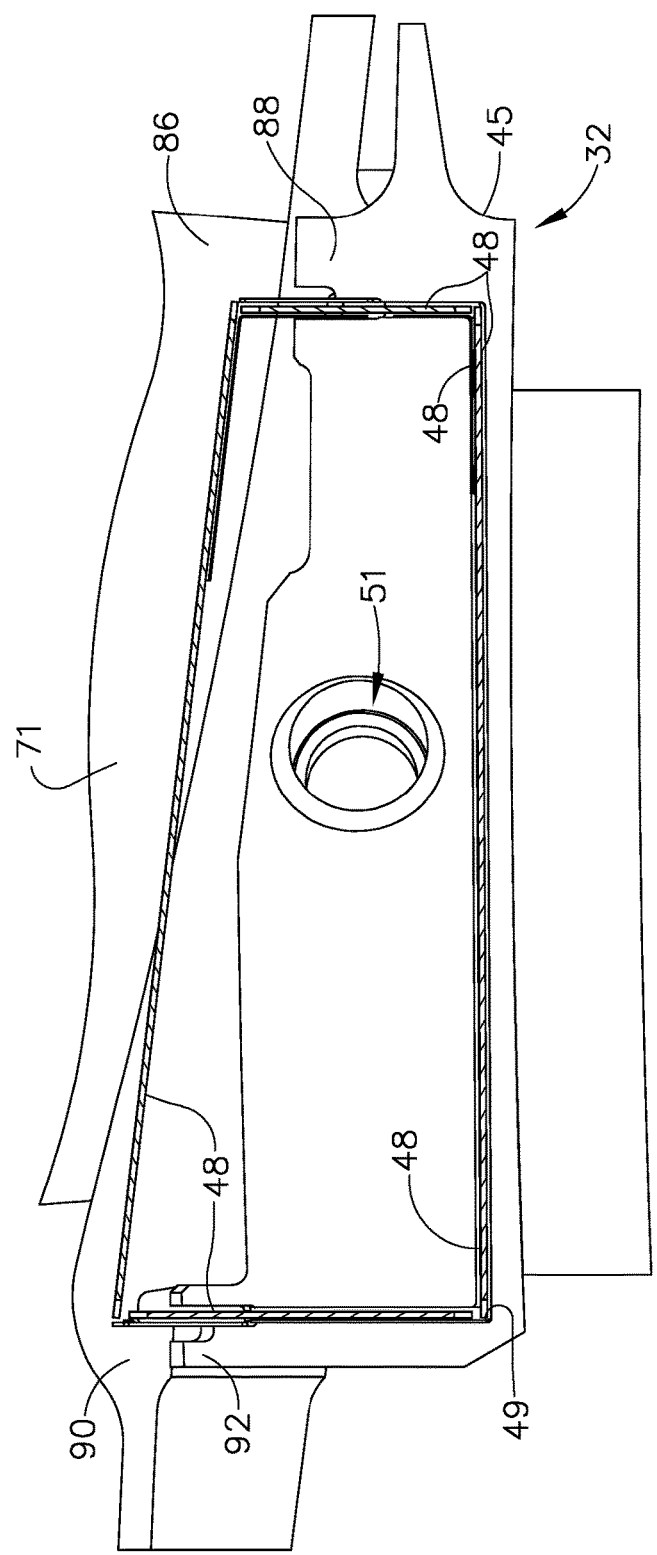
FIG. 14 is a sectional side view illustration of spline seals in a side of the inner support ring segment in the turbine nozzle segment illustrated in FIG. 8.

Referring to FIGS. 7-9, disposed above the fairing 50 is the outer support ring 37 which connects the nozzle segment 32 to a static structure 13. The outer support ring 37 also extends circumferentially and axially between a forward end 82 and an aft end 84. The outer support ring 37 further captures the fairing 50 on the strut 70 between the outer support ring 37 and the inner support ring 38. The strut 70 is fastened to the outer support ring 37 and connected to the inner support ring 38 to transfer load through the nozzle segment 32. The fairing 50 is positioned to float on the strut 70 and is captured between the outer support ring 37 and inner support ring 38.

Circular collars 105, 106 positioned on the inward surface of the inner support ring receive the strut 70 providing engagement with the inner support ring and may be fastened, according to one embodiment, through a slip-fit pin connection capturing the strut 70 in the inner support ring. Flow cavities 51 in the radially inner support ring segments 45 together serve as the annular cooling air plenum 46. The annular cooling air plenum 46 receives the cooling air 29 channeled through circumferentially spaced apart hollow stator airfoils 39 of the high pressure turbine nozzle 20 at a substantially high pressure +P. The annular cooling air plenum 46 helps to balance or even out the flow of the cooling air 29 and minimize pressure differentials between all the flow cavities 51.

The exemplary embodiment of the turbine nozzle segment 32 illustrated in FIGS. 6-14 include forward and aft turbine leaf seal assemblies 78, 80 positioned at forward and aft ends 82, 84 of the nozzle segment 32 between the inner support ring and the inner band segment 71 of the fairing 50. Each of the forward and aft turbine leaf seal assemblies 78, 80 includes radially spaced apart first and second or arcuate leaf seal upper and lower grooves 9, 11 in forward upper and lower flanges 86, 88 and aft upper and lower flanges 90, 92 of the inner band segment 71 and the inner support ring segment 45, respectively. Each of the arcuate leaf seals 52 is trapped in the upper and lower grooves 9, 11.

Referring further to FIGS. 3 and 4, upper and lower leaf seal portions 54, 56 of the arcuate leaf seal 52 are disposed in the upper and lower grooves 9, 11 respectively. The arcuate leaf seals 52, as illustrated in FIG. 3, includes an arcuate body 58 and at least one circumferential retention tab 61 extending radially away from the arcuate body 58. The circumferential retention tab 61 is disposed in and engages a notch 63 in a forward annular wall 72 or an aft annular wall 73 of the upper or lower grooves 9, 11. The upper and lower grooves 9, 11 and the arcuate leaf seal 52 disposed therein extend circumferentially all the way across the turbine nozzle segment 32 between clockwise and counter-clockwise side edges 108, 118 of the turbine nozzle segment 32.

Spline seals 48 disposed in spline seal slots 49 are used to seal between the circumferentially adjoining nozzle segments 32 as illustrated in FIGS. 7-14. The spline seal slots 49 include axially extending upper slots disposed in the inner band segments 71 of the nozzle fairings 50 which may be made of a CMC as illustrated herein. The spline seal slots 49 further include axially extending lower slots disposed in the inner support ring segments 45. The spline seal slots 49 also include radially extending forward and aft slots disposed in the upper and lower flanges 86, 88 of the inner band segment 71 and the inner support ring segment 45 respectively. The nozzle fairing 50 includes radially spaced apart the inner and outer band segments 71, 74 and a fairing airfoil 98 therebetween. One particular embodiment of the nozzle fairing 50 is a CMC fairing 50 made of a ceramic matrix composite material. The spline seals 48 seal circumferentially adjacent flow cavities 51 providing sealing therebetween and sealing for the annular cooling air plenum 46. The spline seals 48 maintain sealing of the annular cooling air plenum 46 between the circumferentially radially inner support ring segments 45 and continuity thereof between the flow cavities 51.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

What is claimed is:

1. A segmented turbine nozzle comprising:
   a ring of turbine nozzle segments circumscribed about an axis;
   each of the turbine nozzle segments includes a radially inner support ring segment, a radially outer support ring segment, and at least one nozzle fairing supported and disposed therebetween;
   radially spaced apart inner and outer band segments of the nozzle fairing and a hollow fairing airfoil extending radially therebetween;
   a strut radially disposed through the hollow fairing airfoil and coupled to and operable for carrying load between the inner and outer support ring segments;
   at least one gas turbine engine arcuate leaf seal assembly including an arcuate leaf seal extending radially and circumferentially between the inner band segment and the inner support ring segment; and
   upper and lower leaf seal portions of the arcuate leaf seal disposed in radially spaced apart arcuate leaf seal upper and lower grooves in the inner band segment and the inner support ring segment respectively.

2. The turbine nozzle as claimed in claim 1, further comprising:
   forward and aft turbine leaf seal assemblies including the at least one gas turbine engine arcuate leaf seal assembly,
   the forward and aft turbine leaf seal assemblies positioned at forward and aft ends of the nozzle segment respectively between the inner support ring segment and the inner band segment of the fairing,
   each of the forward and aft turbine leaf seal assemblies including an arcuate leaf seal extending radially and circumferentially between the inner band segment and the inner support ring segment,
   each of the forward and aft turbine leaf seal assemblies including radially spaced apart arcuate leaf seal upper and lower grooves in upper and lower flanges of the inner band segment and the inner support ring segment respectively, and upper and lower leaf seal portions of each of the arcuate leaf seals of each of the forward and aft turbine leaf seal assemblies disposed in the radially spaced apart arcuate leaf seal upper and lower grooves in the inner band segment and the inner support ring segment respectively.

3. The turbine nozzle as claimed in claim 2, further comprising each of the leaf seals including an arcuate body and at least one circumferential retention tab extending radially away from the arcuate body.

4. The turbine nozzle as claimed in claim 3, further comprising each retention tab disposed in a notch in a forward or aft annular wall or an aft annular wall of each of the upper or lower grooves and each retention tab being sufficiently flexible for the leaf seal to engage seal edges on upper and lower faces of each of the upper and lower grooves respectively during engine operation over entire range of engine operation.

5. The turbine nozzle as claimed in claim 4, further comprising each of the leaf seals having a thickness in a range of from 3 mils to 35 mils.

6. The turbine nozzle as claimed in claim 4, further comprising each of the leaf seals made of a material with torsional stiffness in a range between 0.015 lb/in and 0.15 lb/in.

7. The turbine nozzle as claimed in claim 4, further comprising one of the inner band segment and the inner support ring segment including a ceramic matrix composite material.

8. The turbine nozzle as claimed in claim 4, further comprising the at least one nozzle fairing made of a ceramic matrix composite material.

9. The turbine nozzle as claimed in claim 2, further comprising an annular cooling air plenum including flow cavities disposed in the inner support ring segments and in flow communication with the hollow fairing airfoils.

10. The turbine nozzle as claimed in claim 9, further comprising:
   each of the leaf seals including an arcuate body and at least one circumferential retention tab extending radially away from the arcuate body,
   the retention tab disposed in a notch in a forward or aft annular wall or an aft annular wall of each of the upper or lower grooves, and
   the retention tab being sufficiently flexible for the leaf seal to engage seal edges on upper and lower faces of each of the upper and lower grooves respectively during engine operation over entire range of engine operation.

11. The turbine nozzle as claimed in claim 10, further comprising each of the leaf seals having a thickness in a range of from 3 mils to 35 mils and/or each of the leaf seals made of a material with torsional stiffness in a range between 0.015 lb/in and 0.15 lb/in.

12. The turbine nozzle as claimed in claim 4, further comprising:
   the annular cooling air plenum including spline seals sealingly disposed between circumferentially adjoining ones of the turbine nozzle segments;
   the spline seals disposed in spline seal slots; and
   the spline seal slots including axially extending upper slots disposed in the inner band segments of the nozzle fairings, axially extending lower slots disposed in the inner support ring segments, radially extending forward and aft slots disposed in the upper and lower flanges of the inner band segment and the inner support ring segment respectively.

* * * * *